Sept. 23, 1969  M. P. ELLIOTT  3,468,290
DOG RATTLE
Filed Aug. 21, 1967

INVENTOR

MINTIE P. ELLIOTT

BY Krafft & Wells
ATTORNEYS

# United States Patent Office 3,468,290
Patented Sept. 23, 1969

3,468,290
DOG RATTLE
Mintie P. Elliott, Rte. 1, Glen Rose, Tex. 76043
Filed Aug. 21, 1967, Ser. No. 661,990
Int. Cl. A01k 29/00
U.S. Cl. 119—29   6 Claims

ABSTRACT OF THE DISCLOSURE

A dog rattle comprising a hollow cylindrical shell of resilient metal with one end of the shell open while the other end is closed by an end wall having two perforations therein, a cylindrical body of wood or bone with an axial bore therethrough positioned across the outside of the perforated end wall, a freely swinging striker in the shell, and a flexible strand threaded through the cylindrical body, through the two perforations and connected at its free end to the striker.

BACKGROUND OF THE INVENTION

The field of the invention is animal training devices and amusement devices and toys having rattles as a source of sound.

The closest prior art device known is disclosed in U.S. Patent 2,194,736 of De Bruler, issued Mar. 26, 1940, but De Bruler does not show the concept or construction of the present device.

SUMMARY OF THE INVENTION

It is an object of the present invention to provide an amusement device for dogs comprising a rattle.

Another object of the invention is a training device for teaching dogs to retrieve.

Upon further study of the specification and claims, other objects and advantages of the present invention will become apparent.

A device for amusing and training dogs is provided according to the present invention by removing one end of a large tin can, placing two holes in the other end of the tin can, threading a large wooden spool having a length less than the width of the tin can, introducing the thread through the holes of the perforations in the tin can, knotting the thread inside the perforations, and fixing a weight at the end of the thread which is extended toward the open end of the tin can.

In operation, a dog grasps the wooden spool in his teeth and amuses and exercises himself by shaking the tin can wherein the rattle encourages him to continue. To the dog the toy appears animated and the dog may be trained to retrieve by throwing the toy so that it may be recovered.

BRIEF DESCRIPTION OF THE DRAWING

The device is explained more in detail with reference to the accompanying drawing, wherein.

Figure 1:
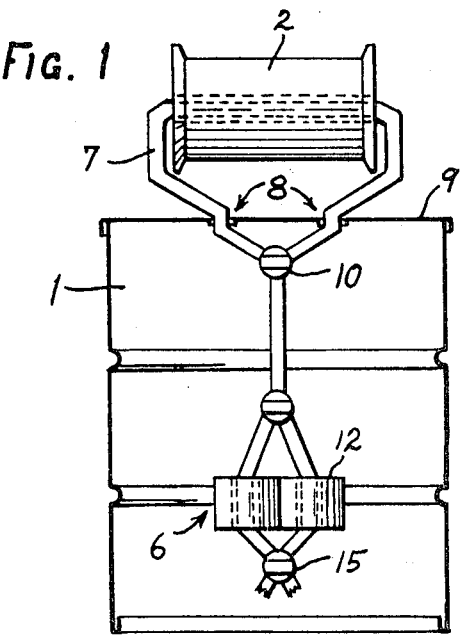
FIGURE 1 is a showing, partly in cross section, of a dog rattle comprising a wooden spool, a tin can, a cord connecting the spool and tin can and a striker connected to the end of the cord inside the tin can.

With particular reference to FIGURE 1, a cylindrical shell 1 is shown having an end wall 9 with perforations 8 therein. Wooden spool 2 is attached to the cylindrical shell by flexible strand 7 having knot 10 inside the end wall and striker 6 comprising apertured weight 12 held in position by knot 15.

Figure 2:
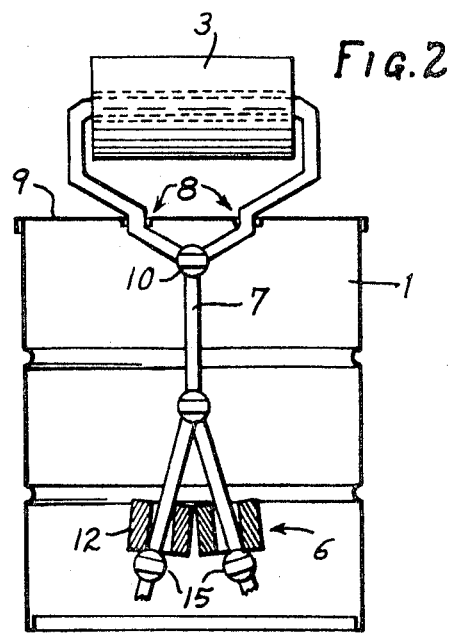
FIGURE 2 is a modified showing of the dog rattle of FIGURE 1, wherein a different material is used for the spool and the cord is connected to the striker in a different way.

In FIGURE 2, cylinder 3 is composed of synthetic or real bone and the apertured weight 12 is secured by knots 15.

Figure 3:
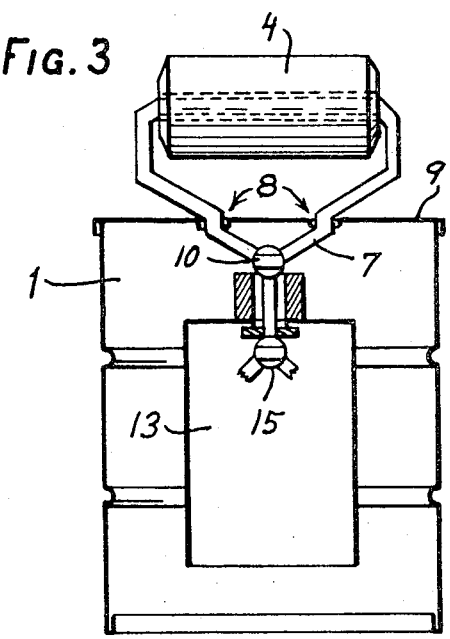
FIGURE 3 is a further modification of the dog rattle of FIGURE 1, wherein a cylindrical shell is substituted for the striker.

FIGURE 3 has resilient cylinder 4 composed of material such as rubber and cylindrical shell 13 is attached to cord 7 by knot 15.

Figure 4:
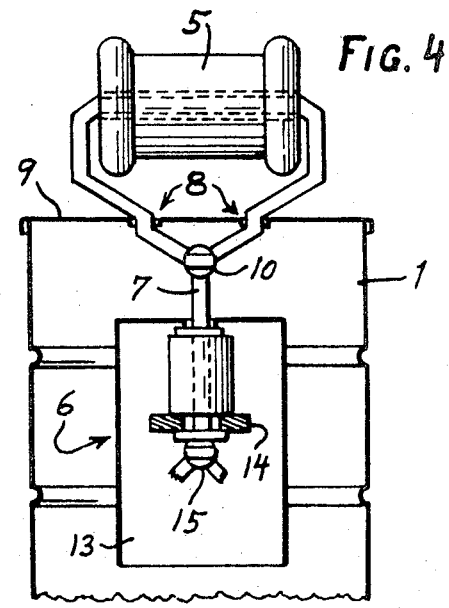
FIGURE 4 is a further modification of FIGURES 1 and 3 wherein another striker is inserted inside the cylindrical shell.

The cylinder 5 of FIGURE 4 can be composed of polypropylene and the striker 6 has the elements of cylindrical shell 13 and striking member 14 held in position by knots 10 and 15.

DESCRIPTION OF THE PREFERRED EMBODIMENTS

The device in each case comprises as its essential parts a hollow cylindrical shell 1 of resilient sheet metal such as an empty tin can, with a perforated end wall, a substantially cylindrical body 2, 3, 4 or 5 of wood, bone, resilient material or plastic with an axial bore in it, a swinging striker 6 in the cylindrical shell, and a flexible strand 7 such as a cord or rope that is threaded through the axial bore of the cylindrical body and through the two perforations 8 in the end wall 9 of the cylindrical shell, the two free ends of the strand 7 being then connected to the swinging striker.

The cylindrical shell 1 can be of the same construction in any form of the device, but the cylindrical bodies 2–5 can have various forms but are preferably of either wood, bone, rubber or plastic and are preferably of a length slightly less than the diameter of the shell 1, but slightly greater than the distance between the two perforations 8. After the strand 7 is threaded through the cylindrical body and through the two perforations 8, it is tied into a knot 10 to keep the cylindrical body 2–5 in close proximity to the end wall 9. The striker 6 comprises several parts such as apertured weights 12 or a smaller cylindrical shell 13 inside the shell 1. To produce a greater variety of sounds, the shell 13 can have its own striking member 14 suspended inside it, as shown in FIGURE 4. After all the striking members are assembled, the strand 7 is tied into one or more final knots 15.

In order to give the device an aroma that is attractive to the delicate sense of smell of a dog but will either be not noticed at all by humans, the strand 7 or wooden spool 2 can be impregnated with a hot solution of gelatin and meat extract. The knots 10 and 15 are then tied while the preparation is still hot, and after cooling the solution will solidify sufficiently to keep the knots from unravelling.

Since the cylindrical body 2, 3, 4 or 5 is about the only part of the device that a dog can easily grasp with its mouth, it will not require much effort to teach a dog to grasp the device of its own accord.

It will be understood that this invention is susceptible to modification in order to adapt it to different usages and conditions.

I claim:

1. A dog training device comprising a hollow cylindrical shell of resilient metal having a first open end and a second end with a wall having two perforations therein, a substantially cylindrical body with an axial bore in proximity to the outer surface of the second end said body having a length slightly greater than the distance between the two perforations, a flexible strand threaded through the bore and through the perforations, having a knot inside the shell immediately behind the perforations, and a striker carried by the free end of the strand with sufficient freedom of movement to strike the inner surface of the shell.

2. The device of claim 1, wherein the free end of the strand securing the striker is tied into a second knot.

3. The device of claim 1, wherein the strand has two free ends tied into a single knot.

4. The device of claim 1, wherein said striker comprises a cylindrical shell.

5. The device of claim 4, further comprising a striking member within said cylindrical shell.

6. The device of claim 1, wherein said cylindrical shell is a tin can and said cylindrical body is a wooden spool.

References Cited
UNITED STATES PATENTS

| | | | |
|---|---|---|---|
| 1,720,038 | 7/1929 | Feldstein | 46—193 |
| 2,194,736 | 3/1940 | De Bruler | 119—29.5 |
| 3,315,640 | 4/1967 | Gamble | 119—29 |

HUGH R. CHAMBLEE, Primary Examiner